(12) United States Patent
Speranza

(10) Patent No.: US 10,186,849 B2
(45) Date of Patent: Jan. 22, 2019

(54) METHOD AND APPARATUS FOR REPAIRING ISO BUS ELECTRICITY TRANSFER SYSTEMS

(71) Applicant: Richard Joseph Speranza, Export, PA (US)

(72) Inventor: Richard Joseph Speranza, Export, PA (US)

(73) Assignee: Speranza Machining, Inc., Export, PA (US)

( * ) Notice: Subject to any disclaimer, the term of this patent is extended or adjusted under 35 U.S.C. 154(b) by 180 days.

(21) Appl. No.: 15/223,021

(22) Filed: Jul. 29, 2016

(65) Prior Publication Data

US 2017/0040785 A1 Feb. 9, 2017

Related U.S. Application Data

(60) Provisional application No. 62/200,759, filed on Aug. 4, 2015.

(51) Int. Cl.
*H01R 43/00* (2006.01)
*H02G 1/16* (2006.01)
*H02G 3/04* (2006.01)
*H02G 5/06* (2006.01)

(52) U.S. Cl.
CPC .............. *H02G 1/16* (2013.01); *H02G 3/0481* (2013.01); *H02G 5/06* (2013.01)

(58) Field of Classification Search
CPC ........... H02G 1/16; H02G 3/0481; H02G 5/06
See application file for complete search history.

(56) References Cited

U.S. PATENT DOCUMENTS

| 2,396,131 | A | 3/1946 | Scott |
| RE23,811 | E | 3/1954 | Scott |
| 3,809,801 | A | 5/1974 | Niemoller |
| 4,215,237 | A | 7/1980 | Burtnett |
| 4,296,273 | A | 10/1981 | Hologa |
| 5,515,603 | A * | 5/1996 | Ziemek ............... H01B 13/2633 174/107 |
| 6,230,391 | B1 | 5/2001 | Chilton |
| 7,612,293 | B2 | 11/2009 | Arcand |
| 8,759,684 | B2 * | 6/2014 | Seifert ................... H01B 9/065 174/158 R |
| 8,782,870 | B2 | 7/2014 | Link |

FOREIGN PATENT DOCUMENTS

CN 202423923 9/2012

* cited by examiner

*Primary Examiner* — Paul D Kim
(74) *Attorney, Agent, or Firm* — Tucker Arensberg, P.C.

(57) ABSTRACT

An apparatus and method comprising an access tube which is insertable into a duct via a flange once an insulator of the ISO Bus system is removed. The access tube is configured so one end connects to the surface of the conductor and the second end remains open to the outside of the duct. The method comprises removing at least one insulator from the ISO Bus system and inserting the access tube through a flange and accessing the damaged conductor with one or more repair tools via an open end of the access tool. Any debris generated during the repair is contained in the access tube and can be easily vacuumed before removing the access tube.

15 Claims, 7 Drawing Sheets

METHOD AND APPARATUS FOR REPAIRING ISO BUS ELECTRICITY TRANSFER SYSTEMS

RELATED APPLICATIONS

This Application claims priority under 35 U.S.C. § 119(e) to U.S. Provisional Patent Application No. 62/200,759, filed on Aug. 4, 2015, entitled "Method and Apparatus for Repairing ISO BUS Electricity Transfer Systems," which is hereby incorporated by reference in its entirety.

BACKGROUND

ISO Bus electricity transferring systems are used throughout the electrical generating and transmission industry. A typical ISO Bus electrical system, which is illustrated in FIG. 1, includes a bus conductor 111 which is contained within a concentric outer duct, enclosure or other housing 106. The figures of the present disclosure illustrate cylindrical conductors however the conductors may have any shape known in the art. The conductor 111 may be a smaller pipe located within the duct 106 which is a larger pipe with an air gap in between the conductor 111 and the duct 106. The conductor 111 is held in its concentric position by insulators 116, 117, and 118 (insulator 118 is illustrated in FIG. 2) which are inserted through flanges 122, 123, and 124 (flange 124 is illustrated in FIG. 2). As seen in FIG. 2, insulators 116, 117, and 118 are radially disposed within the duct 106 and serve to hold or retain conductor 111 in an approximately concentric location. Each insulator 116, 117, and 118 has corresponding contact points 130, 131, and 132 which bear against the conductor 111 and hold it in position within the duct 106. It is noted that the number of insulators 116, 117, and 118 may vary between ISO Bus electrical system designs as needed to hold the insulator 111 in place. The number of insulators set forth herein is for illustrative purposes only and is in no way intended to limit the scope of the present invention.

During use of the ISO Bus electrical system 100, the conductor 111 will be subject to axial and radial movements as a result of changes in temperature, mechanical stress, or other environmental factors or normal wear and tear. These changes can cause wearing or galling damage to the conductor 111 at one or more locations. Areas that are at risk for wearing or galling include those areas around the points of contact 130, 131, and 132 of the insulators 116, 117, and 118 with the conductor 111. For example, an area of damage to the conductor 111 is identified by reference numeral 135 in FIG. 2 at and around contact points 130, 131, and 132. Accessing damaged areas 135 of the conductor 111 for repairs is challenging because the duct 106 is a continuous cylindrical surface. This means that access must be gained to the interior of duct 106 to make a repair to conductor 111 which is located inside. As illustrated in FIG. 3, one method of the prior art involves cutting into duct 106 near the damaged area 135 and removing an access cutout 128, creating an opening 134 through which the damaged area 135 of conductor 111 can be repaired by whatever means is appropriate. Upon completion of the repairs, access cutout 128 is welded back into place, and the welds smoothed or blended. However, dust, welding material, and metal shavings from the repair may still remain in duct 106 and on conductor 111 using this repair method. Any such debris can be detrimental to the performance of the ISO Bus electrical system and hazardous to any individual or equipment close by due to the very high voltages carried by conductor 111.

Further, the existing insulator hole through the duct mounting flanges 122, 123, and 124 are not suitable for making repairs and would be too confining and restricting to make manual repairs. While manual hand grinding can be performed without an access tube, any resulting dirt contamination generated using this method is not acceptable.

In addition to being inefficient and hazardous, the methods of the prior art are expensive and time consuming. There exists a need for a novel apparatus and method for repairing damaged areas of an ISO Bus electrical system, and the conductor 111 in particular, that is safer, more reliable, more efficient and less expensive than the methods disclosed in the prior art.

SUMMARY OF THE INVENTION

The present disclosure provides for a novel apparatus and method for accomplishing a variety of repairs on damaged conductors of an ISO Bus system. In one embodiment, the present disclosure provides for an apparatus for repairing a damaged area of a conductor of an ISO Bus electrical system wherein the conductor is concentrically located within a duct and wherein the conductor is held in position by one or more insulators which are inserted through the duct via a flange and have contact points with each insulator. In such an embodiment, the apparatus may comprise an access tube having a predetermined cross section which is insertable into the duct via a flange upon removal of an insulator wherein one end of the access tube is configured to connect with the surface of the conductor and wherein the second end of the access tube is configured so as to connect with the surface of a cylindrical conductor.

In another embodiment, the present disclosure provides for a method for repairing a damaged area of a conductor of an ISO Bus electrical system comprising: providing an ISO Bus electrical system comprising a conductor concentrically located within a duct, wherein the conductor is held in position by one or more insulators which are inserted through the duct via a flange and have contact points with each insulator; removing at least one insulator and inserting an access tube through the flange, wherein one end of the access tube is configured to connect with the surface of the conductor and wherein the second end of the access tube is open to the outside of the duct; accessing the damaged area of the conductor with one or more repair tools via the open end of the access tube to thereby repair the damaged area of the conductor; and removing the access tube once repairs are completed and inserting the insulator through the flange.

The apparatus and method disclosed herein overcome the limitations of the prior art by creating a protective environment for repairing damaged areas of a conductor. For example, the access tube may be used for hand grinding of the galled or damaged area. If the damaged area is beyond the ability to repair by hand, the access tube can serve as a mounting station for a variety of repair method accessories. The possible methods include but are not limited to drilling holes for mounting customer designed repair plates, weld overlaying, and miscellaneous machining operations.

The apparatus and method disclosed herein enable repairs to the conductor to be made through one or more flanges once the insulator proximately located to the damaged area has been removed. There is no need to cut into the duct or create and replace an access cutout as provided by the prior art. This approach significantly reduces the time and cost for repair operations and reduces the need for post repair cleaning in the air gap between the duct and the conductor. The approach also significantly increases the safety of making such repairs because any debris that is generated is confined to the access tube and does not enter the duct or make contact with the conductor.

BRIEF DESCRIPTION OF THE DRAWINGS

The accompanying drawings, which are included to provide further understanding of the disclosure and are incorporated in and constitute a part of this specification, illustrate embodiments of the disclosure and, together with the description, serve to explain the principles of the disclosure.

In the drawings.

DETAILED DESCRIPTION

Reference will now be made in detail to the preferred embodiments of the present disclosure, examples of which are illustrated in the accompanying drawings. Wherever possible, the same reference numbers will be used throughout the drawings to refer to the same or like parts.

Figure 1:
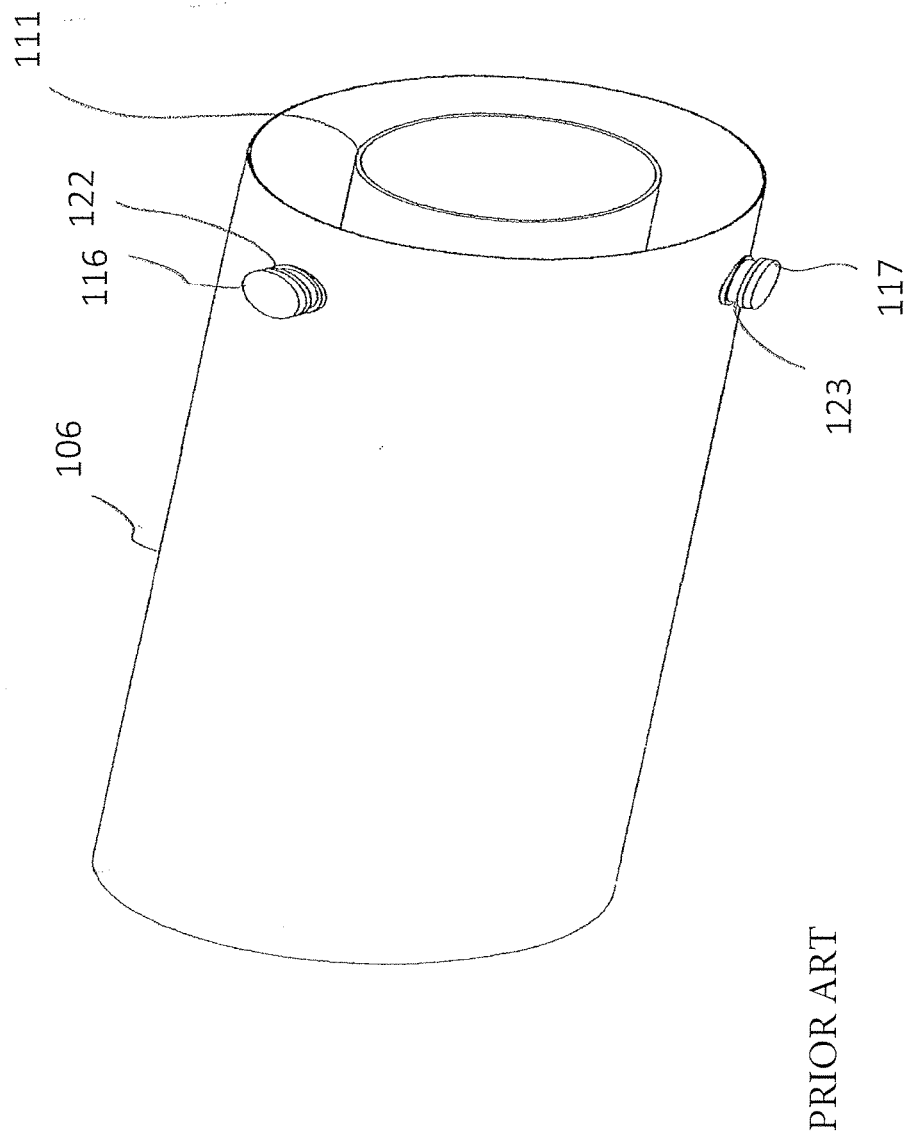
FIG. 1 illustrates an isometric view of an ISO Bus system having a tubular bus conductor and a duct or housing.
Figure 2:
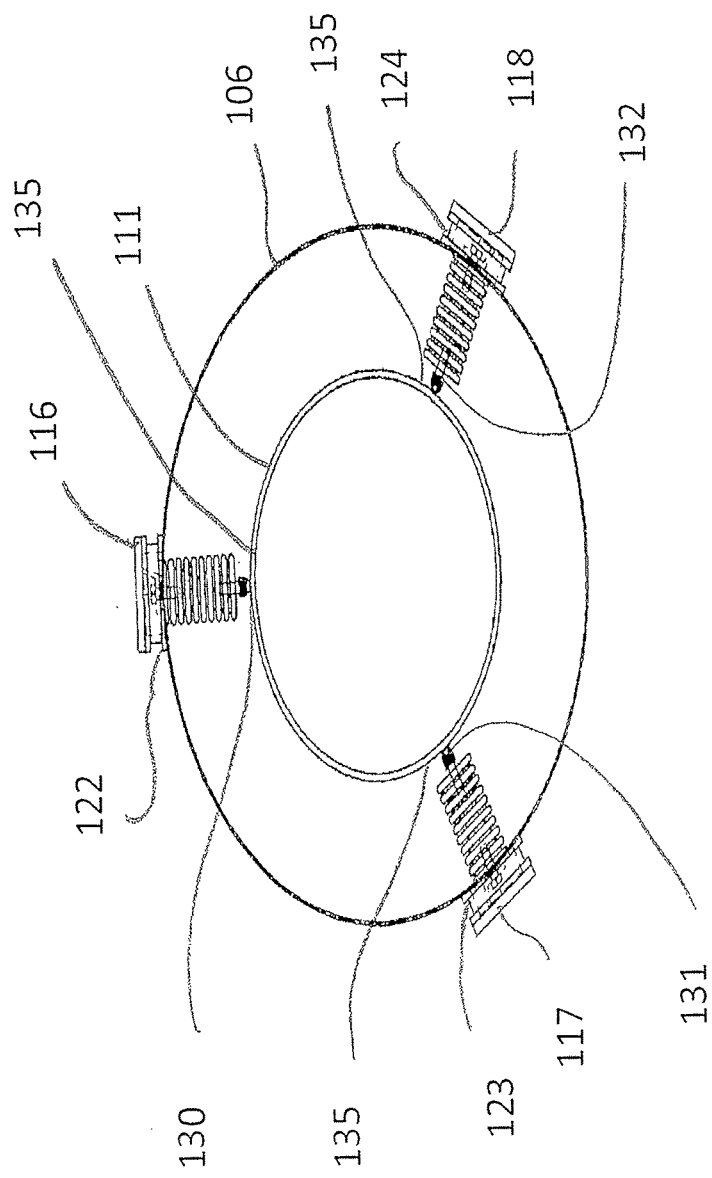
FIG. 2 illustrates an end view of the ISO Bus system represented in FIG. 1.
Figure 3:
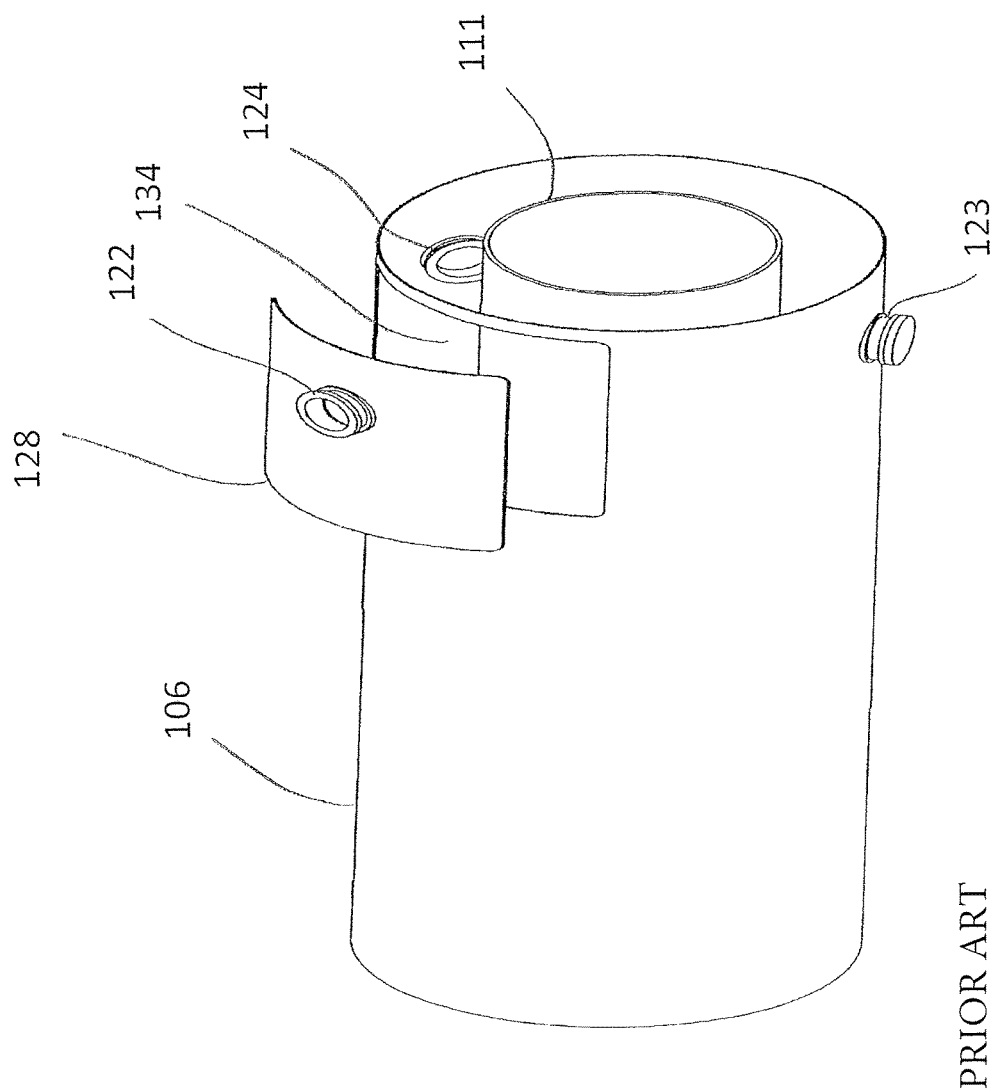
FIG. 3 illustrates an isometric exploded view of an ISO Bus system illustrating a prior art approach to repairing the conductor.
Figure 4:
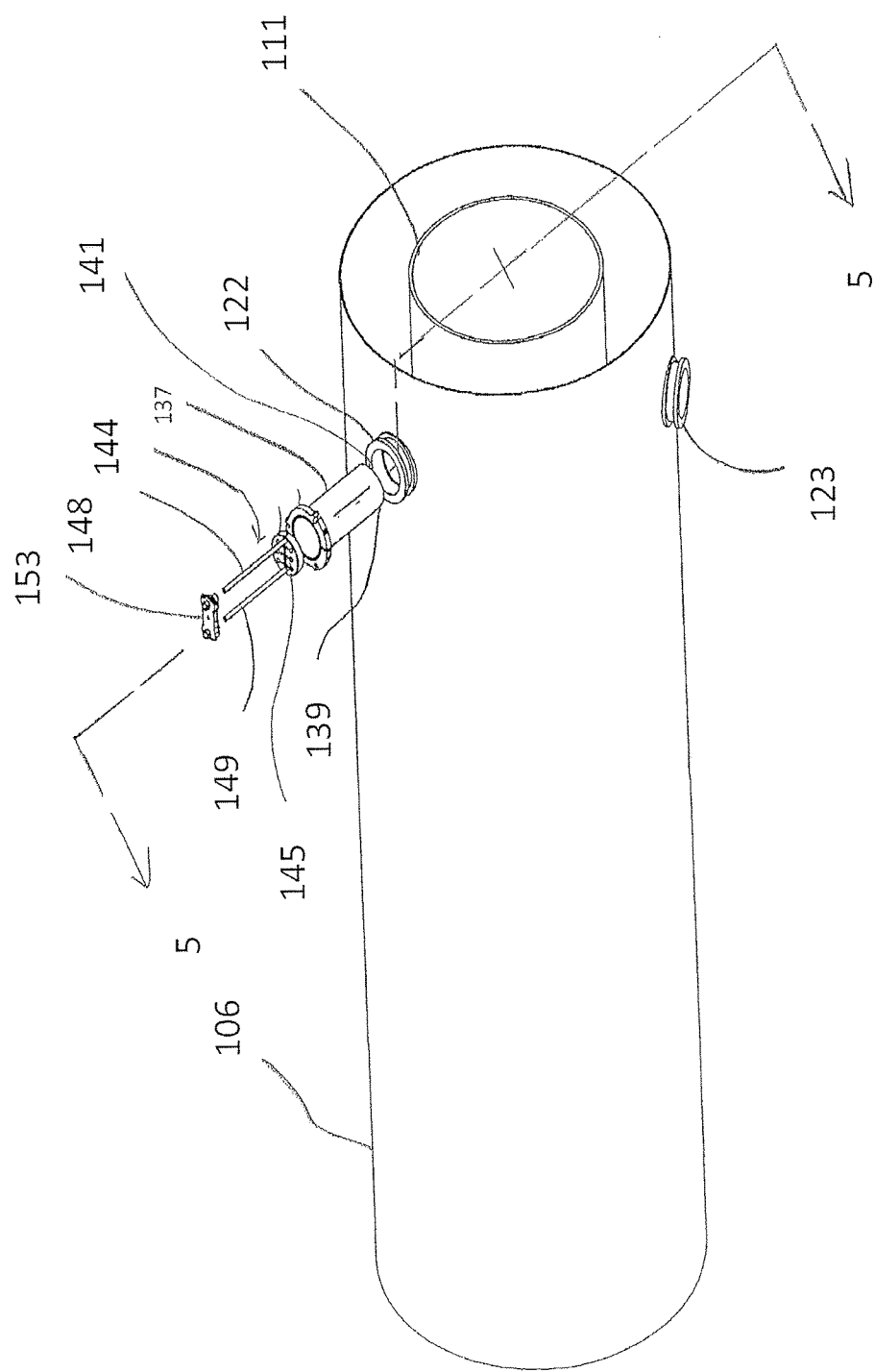
FIG. 4 illustrates an isometric exploded view of the apparatus described herein for repairing the conductor.
Figure 5:
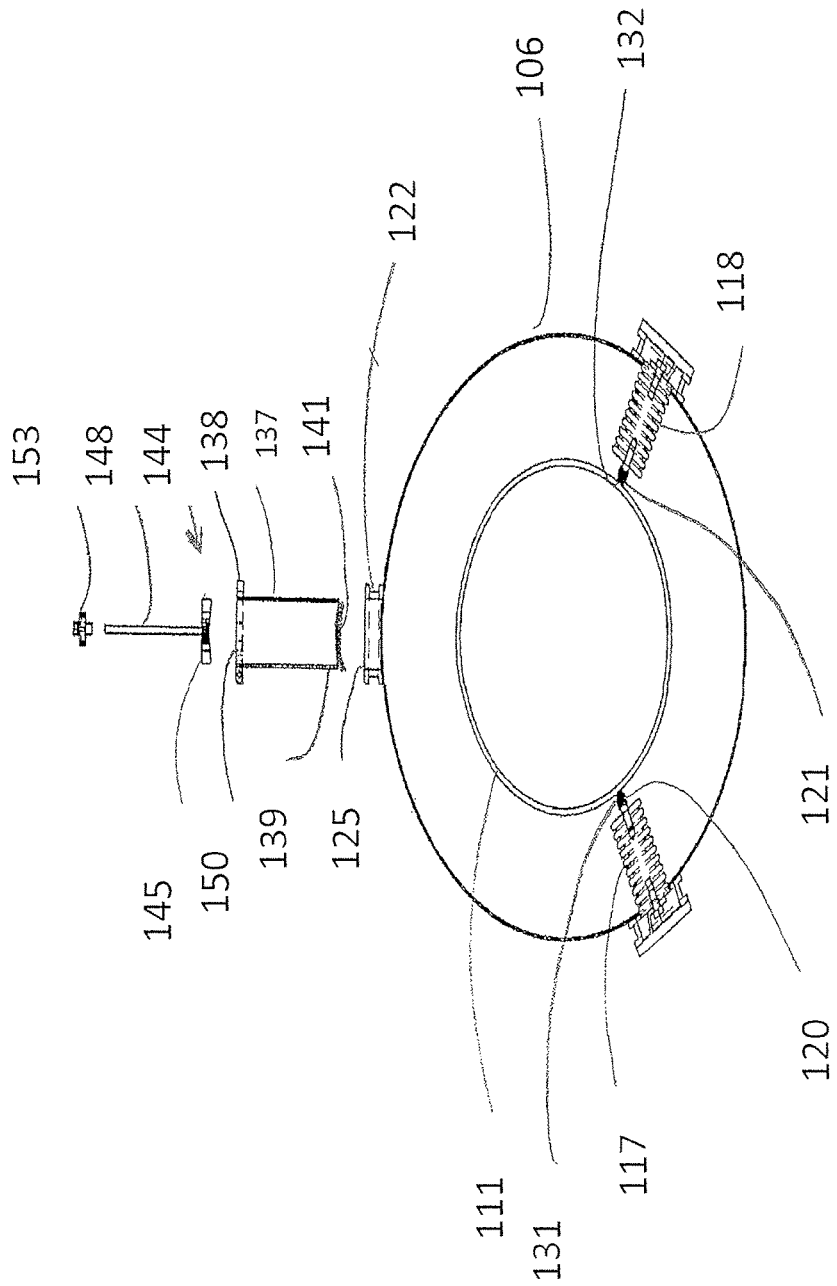
FIG. 5 illustrates a sectional view taken along lines 5-5 of FIG. 4.

The present disclosure provides for a novel apparatus and method, which overcomes the limitations of the prior art, and provides for an efficient, reliable, and cost effective means for repairing damaged areas of an ISO Bus electrical system. In one embodiment, as illustrated by FIG. 4 and FIG. 5, an apparatus may comprise an access tube 137 having a predetermined cross section which is insertable via a flange 122 upon removal of an insulator (not illustrated in FIG. 4). As seen in FIG. 4 and FIG. 5, the insulator 116 has been removed from its flange 122, permitting access to the interior of duct 106. Any of the three flanges 122, 123, or 124 could be considered for this purpose, depending on where the damaged area of the conductor is, but for purposes of illustration, flange 122 will be discussed. One end 139 of the access tube 137 may be configured so as to form a connection with the surface of the conductor 111. In one embodiment, this end 139 may be shaped in a manner that is compatible with the shape of the conductor 111. For example, as illustrated in FIG. 4, the end 139 may have a saddle shape to be compatible with the shape of the cylindrical conductor 111. In one embodiment, the access tube 137 may comprise aluminum. However, the present disclosure contemplates that a variety of materials known in the art may be used to construct the access tube 137 and this embodiment should in no way limit the scope of the present disclosure.

In another embodiment, this end 139 may further comprise a seal 141, including a flexible seal known in the art, to ensure a debris proof barrier is formed between the interior of the access tube 137 and the interior of the duct 106 to prevent any debris generated during repair of the damaged area 135 from entering the duct 106 or making contact with the conductor 111. In one embodiment the seal 141 may comprise a rubber strip, but any sealing mechanism or material known in the art may be used to create the seal 141. A second end 136 of the access tube 137 remains open to the outside of the duct 106 to enable repairs to be made via the access tube from outside of the ISO Bus electrical system. A split ring clamp 138 is configured to be placed over the access tube 137 to secure the access tube 137 into position. The rotatable split ring clamp 138 comprises a plurality of slots 150 that are designed to align with a bolt pattern found on the flange 122.

Figure 6:
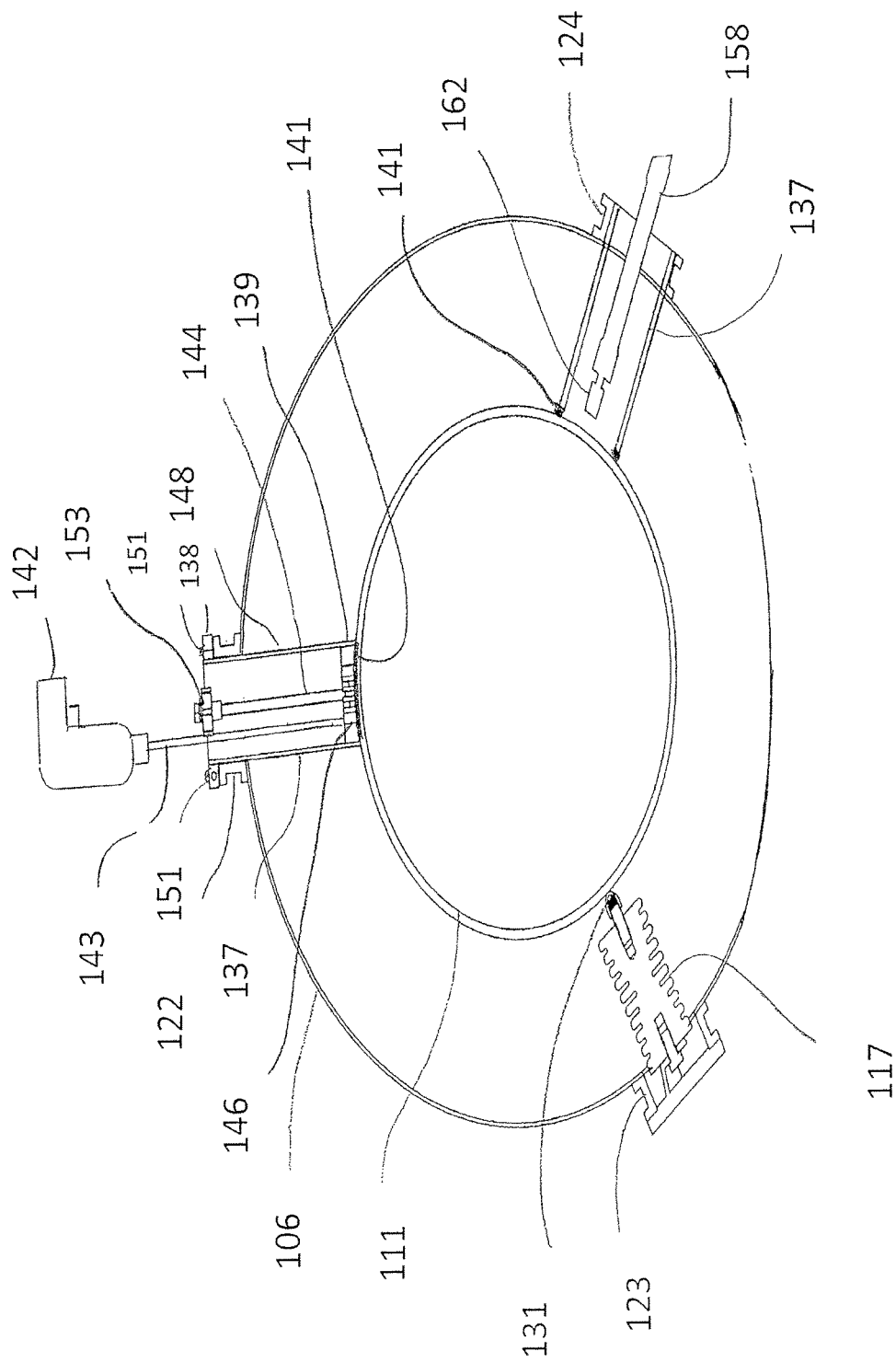
FIG. 6 illustrates an alternative sectional view taken along section lines 5-5 of FIG. 4, illustrating an alternative method of repairing a conductor.

A decision can then be made as to whether or not conductor 111 can be repaired by merely dressing or blending the damaged area 135 or applying one or more smoothing operations as illustrated in FIG. 5. FIG. 6 illustrates an embodiment of the present disclosure where a repair tool 158 is inserted into access tube 137. For purposes of illustration, but not of limitation, repair tool 158 could include a welding tip, air grinder, polishing tool, a machining head, or any similar device which can be used to repair or even apply a new surface to conductor 111. Due to the configuration of end 139 and seal 141, any weld spatter, grinding dust, polishing material, or other debris will be confined to the interior of access tube 137, where it can be easily vacuumed out or otherwise removed.

If more extensive repairs to conductor 111 are required, in yet another embodiment, a jig 144 can be inserted into access tube 137 to make such repairs. The jig 144 includes drill locator 145 which in turn includes a plurality of drill bit guides 146 into which a drill bit (not illustrated) and drill bit extension 143 and/or thread tap can be inserted. Drill locator 145 and drill guides 146 can be understood to form a template which permits the drilling and tapping of one or more holes into conductor 111 in a predetermined pattern so that a new surface may be secured to conductor 111. In one embodiment, jig 144 also includes a first member 148 and a second member 149 which are elongated rod shaped members each having two ends. First and second members 148 and 149 are secured to drill locator 145 at one of their ends and are secured to connecting member 153 at their other ends.

FIG. 6 illustrates an embodiment of the present disclosure where the apparatus includes the use of a drill 142. Here, access tube 137 is positioned so that end 139 and seal 141 are sealed against conductor 111, rotatable split ring clamp 138 is placed over access tube 137 and slots 150 are aligned with an existing bolt pattern 125 on flange 126. Split ring clamp 138 can be secured to access tube 137 by tightening split ring bolt 140, and then, split ring clamp 138 and access tube 137 can be secured to flange 122 by inserting and tightening bolts 151 through split ring slots 150 into bolt pattern 125 on flange 122. Other commonly used clamping means may be used in other embodiments. Jig 144 is inserted into access tube 137 and drill locator 145 is adjusted into a predetermined position against conductor 111. The pattern of holes on drill locator 145 can be varied depending on the nature and extensiveness of the required repair to conductor 111. Using drill bit guides 146 as a template, holes may be drilled into conductor 111 using a drill 142 and drill bit extension 143. Drill bit 142 and drill bit extension 143 can then be removed and the holes drilled into conductor 111 can then be threadably tapped using a similar procedure. Jig 144 can then be withdrawn from access tube 137 and a repair surface (not illustrated) of predetermined shape can be attached through access tube 137 to conductor 111 using appropriately sized screws or bolts. After attaching such repair surface, any debris or shavings can be vacuumed or otherwise removed. Access tube 137 can then be removed and insulator 116 reinstalled into flange 122.

Figure 7:
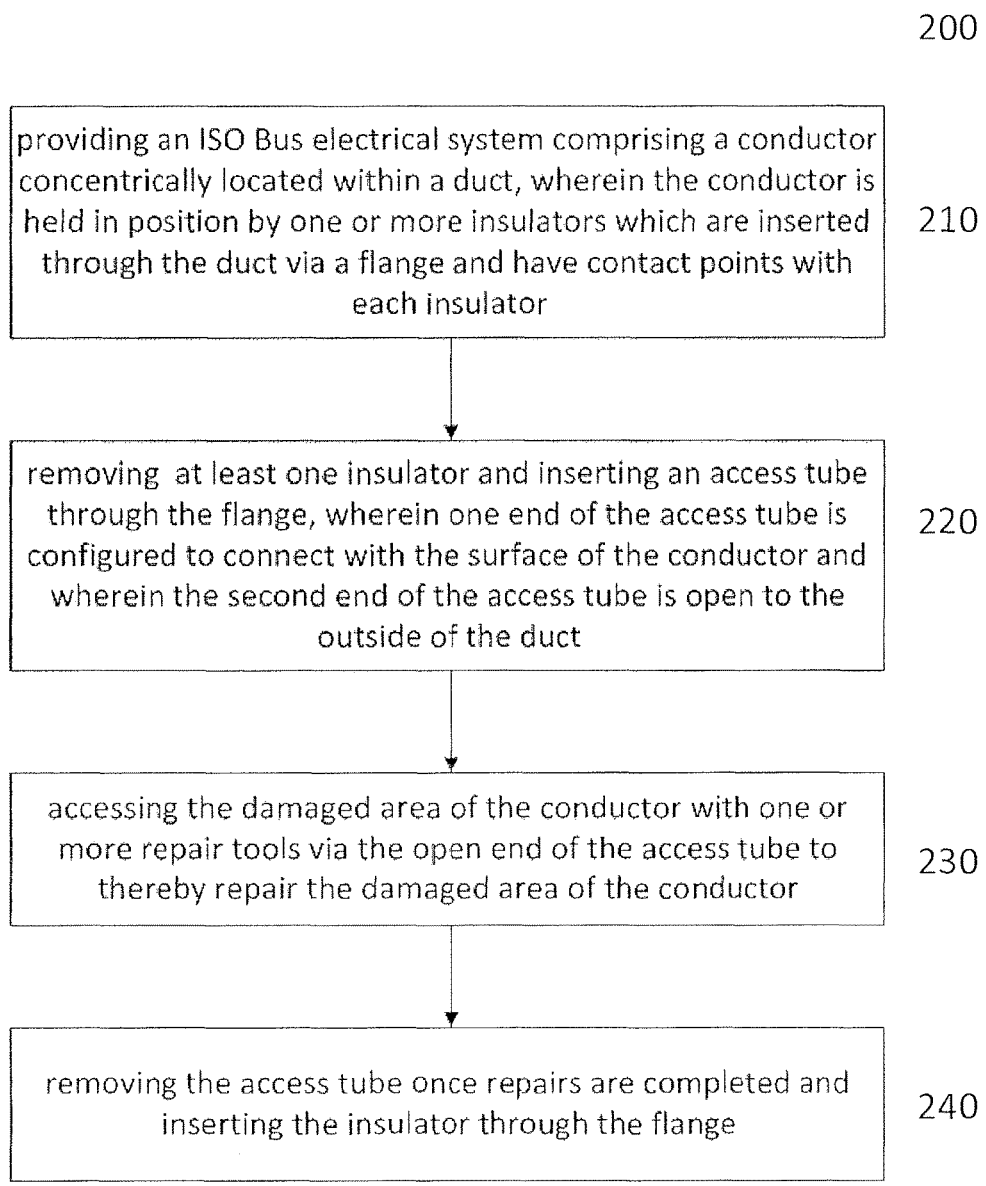
FIG. 7 illustrates a method of the present disclosure for repairing a conductor.

In another embodiment, the present disclosure further comprises a method 200 for repairing a damaged area of a conductor of an ISO Bus electrical system as illustrated in FIG. 7. An ISO Bus electrical system is presented in step 210 wherein the conductor 111 is held in position by one or more insulators 116, 117, and 118 which are inserted through the duct 106 via a flange 122, 123, and 124 and have contact points 130, 131, and 132 with each insulator 116, 117, and 118. In step 220, at least one insulator 116, 117, and 118 is removed and an access tube 137 is inserted through the flange 122, 123, and 124 wherein one end of the access tube 137 is configured to connect with the surface of the conductor 111 and wherein the second end 136 of the access tube 137 is open to the outside of the duct 106. In step 230, the damaged area 135 of the conductor 111 is accessed with one or more repair tools 158 via the open end 136 of the access tube 137 to thereby repair the damaged area 135 of the conductor 111. The access tube 137 is removed in step 240 once repairs to the conductor 111 are completed and the removed insulator 116, 117, and 118 are reinserted into the appropriate flange 122, 123, and 124.

The present disclosure may be embodied in other specific forms without departing from the spirit or essential attributes of the disclosure. Accordingly, reference should be made to the appended claims, rather than the foregoing specification, as indicating the scope of the disclosure. Although the foregoing description is directed to the embodiments of the disclosure, it is noted that other variations and modification will be apparent to those skilled in the art, and may be made without departing from the spirit or scope of the disclosure.

What is claimed is:

1. An apparatus for repairing a damaged area of a conductor of an ISO Bus electrical system wherein the conductor is concentrically located within a duct and wherein the conductor is held in position by one or more insulators which are inserted through the duct via a flange and have contact points with each insulator, the apparatus comprising:
an access tube having a predetermined cross section which is insertable into the duct via the flange upon removal of the one or more insulators wherein one end of the access tube is configured to connect with a surface of the conductor and wherein a second end of the access tube is configured so as to remain open to the outside of the duct;
wherein one end of the access tube is further configured with a seal so as to create a debris proof barrier between an interior of the access tube and an interior of the duct; and
wherein the seal further comprises a flexible seal.

2. The apparatus of claim 1 further comprising a rotatable split ring clamp configured to be placed over the access tube and wherein the rotatable split ring clamp further comprises a plurality of slots and wherein the slots are further aligned with a bolt pattern of the flange.

3. The apparatus of claim 1 further comprising at least one repair tool operably coupled to the apparatus to aid in the repair of the damaged area of the conductor.

4. The apparatus of claim 1 further comprising a jig which is insertable in the access tube comprising a drill locator comprising a plurality of holes sized for guiding at least one of a drill bit and a tread tap to one or more predetermined locations of the conductor.

5. The apparatus of claim 4 wherein the jig further comprises at least one member having two ends where one end of the jig is affixed to the drill locator and where the other end is affixed to an extension connector, wherein the extension connector is removably secured to the flange in a predetermined position.

6. A method for repairing a damaged area of a conductor of an ISO Bus electrical system comprising: providing an ISO Bus electrical system comprising a conductor concentrically located within a duct, wherein the conductor is held in position by one or more insulators which are inserted through the duct via a flange and have contact points with each insulator; removing at least one of the one or more insulators and inserting an access tube through the flange, wherein one end of the access tube is configured to connect with a surface of the conductor and wherein a second end of the access tube is open to the outside of the duct; accessing the damaged area of the conductor with one or more repair tools via the open end of the access tube to thereby repair the damaged area of the conductor; and removing the access tube once repairs are completed and inserting the one or more insulators through the flange.

7. The method of claim 6 wherein repairing the damaged area of the conductor further comprises performing at least one of: blending, dressing, and smoothing operations on the conductor.

8. The method of claim 6 further comprising removing any debris created by repairing the damaged area of the conductor prior to removing the access tube from the flange.

9. The method of claim 8 wherein the debris is further removed by vacuuming the interior of the access tube.

10. The method of claim 6 wherein the one end of the access tube is configured to have a pre-determined shape compatible with the shape of the conductor.

11. The method of claim 6 wherein the one end of the access tube is configured to have a flexible seal so as to conform with the shape of the conductor so as to form a debris proof barrier between the access tube and an interior of the duct.

12. The method of claim 6 wherein the repair tool further comprises at least one of: a jig, a welding tip, a drill, an air grinder, a machining head, and a polishing tool.

13. The method of claim 6 further comprising placing at least one rotatable split ring clamp over the access tube, wherein the rotatable split ring clamp further comprises a plurality of slots and wherein the slots are further aligned with a bolt pattern of the flange.

14. The method of claim 6, wherein the repair tool is a jig comprising a drill bit locator and a plurality of drill bit guides configured to receive at least one of a drill bit, a drill bit extension, and a thread tap.

15. The method of claim 14 further comprising using one or more repair tools to attach a repair surface of a predetermined size through the access tube to the conductor.

* * * * *